United States Patent
Watanabe et al.

[11] Patent Number: 5,872,348
[45] Date of Patent: Feb. 16, 1999

[54] METHOD FOR FORMING A PROJECTION FOR PROJECTION WELDING

[75] Inventors: Motoki Watanabe, Toyota; Yoshiaki Kadoma, Okazaki; Satoshi Kanda, Aichi-ken; Satoshi Shionoya, Okazaki, all of Japan

[73] Assignee: Toyota Jidosha Kabushiki Kaisha, Toyota, Japan

[21] Appl. No.: 879,305

[22] Filed: Jun. 19, 1997

[30] Foreign Application Priority Data

Jun. 21, 1996 [JP] Japan ................... 8-162078

[51] Int. Cl.⁶ ................... B23K 11/14
[52] U.S. Cl. ............... 219/93; 72/356; 219/117.1
[58] Field of Search ............ 219/93, 117.1; 72/352, 356

[56] References Cited

U.S. PATENT DOCUMENTS

| | | | |
|---|---|---|---|
| 1,925,753 | 9/1933 | Fitch et al. | 219/93 |
| 4,495,397 | 1/1985 | Opprecht et al. | 219/93 |
| 4,677,271 | 6/1987 | Opprecht | 219/93 |

FOREIGN PATENT DOCUMENTS 2-280975  11/1990  Japan.

*Primary Examiner*—Clifford C. Shaw
*Attorney, Agent, or Firm*—Burns, Doane, Swecker & Mathis, LLP

[57] ABSTRACT

A method for forming a projection for projection welding includes the steps of: bending a workpiece such that a first end side portion located on one side of the bent portion is perpendicular to a second portion that is located on the opposite side of the bent portion, and pressing the workpiece between a punch and a V-shaped groove of a die. The pressing of the workpiece causes the first portion to the further bent toward the second portion until the inboard surface of the first portion is brought into contact with the second portion. During the pressing step, the outboard surface of the first portion is brought into contact with one surface of the groove while an end surface of the first portion is brought into contact with a second surface of the groove, with the thicknesses of the first portion and the second portion of the workpiece being plastically changed.

19 Claims, 4 Drawing Sheets

METHOD FOR FORMING A PROJECTION FOR PROJECTION WELDING

FIELD OF THE INVENTION

The present invention generally relates to welding. More particularly, the present invention pertains to a method for forming a projection for projection welding.

BACKGROUND OF THE INVENTION

There are various shapes of projections that are used for projection welding. From the standpoint of increasing the welding strength, several requirements have to be satisfied with respect to the projection. In one respect, the projection should have a sharp tip. In addition, the projection should be able to withstand the pressing force imposed on the projection from the electrode without causing large deformation.

If the above-described two requirements are not satisfied, a sufficient welding strength will not be obtained. This is particularly so in the case where the welding length is long, such is the case with ring projection welding.

The projection is formed usually by pressing or forging. From the viewpoint of cost, pressing is preferable. Japanese Patent Publication HEI 2-280975 discloses forming the projection by pressing and then conducting projection welding by pressing the projection against another workpiece. FIG. 11 of the present application illustrates the formation of the projection by pressing while FIG. 12 depicts the way in which the projection welding is conducted by pressing the projection against another workpiece.

In the projection welding shown in FIGS. 11 and 12, since the projection 2 formed in one plate 1 is generally J-shaped, the projection 2 is deformed to a great extent when a pressing force acts on the projection during projection welding. Thus, the contact area of the projection 2 with another workpiece 3 is large. As a result, the electrical current density of the welding electrical current 4 is low, which lowers the amount of heat generated at the contact portion S. This causes insufficient melting of the contact portion and lowering the welding strength.

SUMMARY OF THE INVENTION

According to the present invention, a method for forming a projection is provided, wherein the projection has a substantially sharp tip and is not largely deformed while being pressed during welding so that a high welding electrical current density and sufficient weld strength are obtained.

A method for forming a projection according to the present invention includes a first step of bending a workpiece and a second step of pressing the workpiece. In the first step, the workpiece is bent at a bending portion such that a first portion of the workpiece on one side of the bending portion closer to an end of the workpiece is substantially perpendicular to a second portion of the workpiece on another side of the bending portion further away from the end of the workpiece. In the second step, the first portion and the second portion of the workpiece is pressed between a V-shaped groove portion of a die and a punch so that the first portion is further bent in a direction toward the second portion, until an inboard surface of the first portion is brought into contact with a surface of the second portion opposing the inboard surface of the first portion. During the pressing step, the outboard surface of the first portion is brought into contact with a first surface of the V-shaped groove portion and an end surface of the first portion is brought into contact with a second surface of the V-shaped groove portion, and then thicknesses of the first portion and the second portion plastically change.

Since the corner of the workpiece between the outboard surface and the end surface of the first portion is formed to be a tip of the projection, the tip is sharp. Further, since the inboard surface of the first portion contacts the second portion, the projection is not hollow but solid. When the pressing force during welding acts on the projection, the projection does not cause a large deformation and so the contact area of the projection and another workpiece is maintained small. As a result, the welding electrical current density at the contact area is large, and a sufficient strength of the welded portion is obtained.

BRIEF DESCRIPTION OF THE DRAWING FIGURES

The above and other objects, features, and advantages of the present invention will become more apparent and will be more readily appreciated from the following detailed description of the preferred embodiments of the present invention considered in conjunction with the accompanying drawing figures in which like elements bear like reference numerals and wherein.

DESCRIPTION OF THE PREFERRED EMBODIMENTS

Figure 1A:
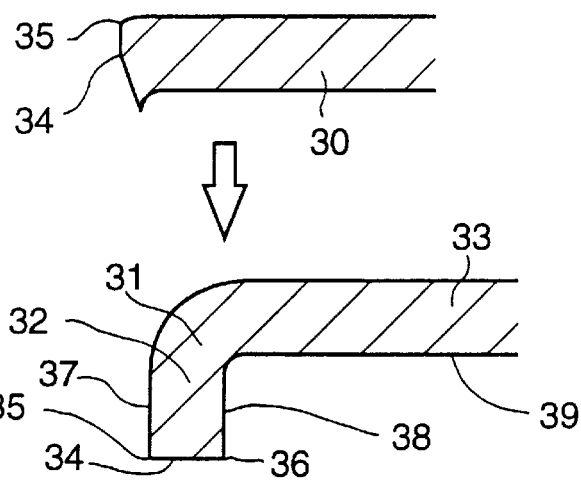
FIGS. 1A–1D are cross-sectional views of a workpiece illustrating how a projection is formed in a method according to a first embodiment of the present invention.

FIGS. 1A–1D illustrate various characteristics associated with all of the embodiments of the present invention. As shown, the apparatus or press machine for forming a projection for projection welding includes a die 11 and a punch 21. The punch 21 is movable relative to the die 11 in a vertical direction. The punch has a surface 22 which opposes the upper surface of the dies 11 and is horizontal and flat.

The upper surface of the die 11 is provided with a V-shaped groove portion 12. The V-shaped groove portion 12 has a sharp lowermost point 15 and two surfaces 14a, 14b (first and second surfaces) which extend upwardly and obliquely away from the lowermost point 15 in leftward and rightward directions as shown in FIG. 1C. Preferably, the angle defined between the first and second surfaces 14a and 14b is equal to or greater than 90 degrees. Also, the first surface 14a forms an angle with the vertical that is equal to the angle which the second surface 14b forms with the vertical. Further, the length of the first surface 14a is greater than that of the second surface 14b.

The method for forming the projection includes a first step shown in FIG. 1A in which a workpiece 30 made from metal is provided. The workpiece 30 has an end surface 34 which has been stamped (shear-cut). Due to the shear-cutting of the end surface, the corner 35 between the end surface 34 and a surface which the stamping die first hits is slightly rounded and an angle of the corner 35 is equal to or greater than 90 degrees.

Figure 1B:
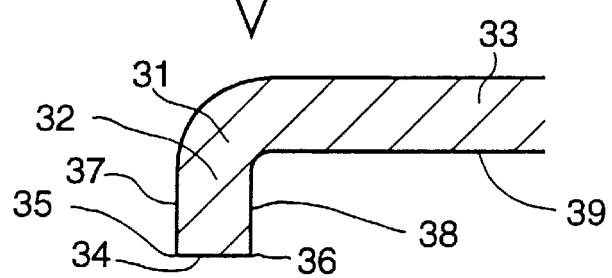
Figure 1C:
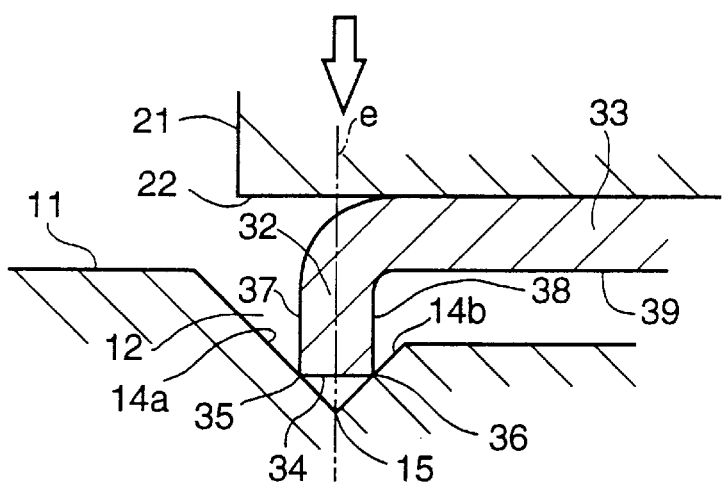

At the second step shown in FIG. 1B, the workpiece 30 is bent at a bending portion 31 such that a first portion 32 of the workpiece that is located on one side of the bending portion 31 positioned closer to the free end surface 34 of the workpiece is substantially perpendicular to a second portion 33 of the workpiece that is located on the opposite side of the bending portion 31 positioned further away from the free end surface 34 of the workpiece. During bending, the surface of the workpiece which the stamping die first hits is set so as to correspond to the outboard surface of the bending. The bending portion 31 is designed so that the length of the first portion 32 is substantially equal to the thickness of the first portion 32. Although the first step and the second step depicted in FIGS. 1A and 1B are illustrated as being independent steps, the stamping and bending may be conducted at the same time in the same step.

Figure 1D:
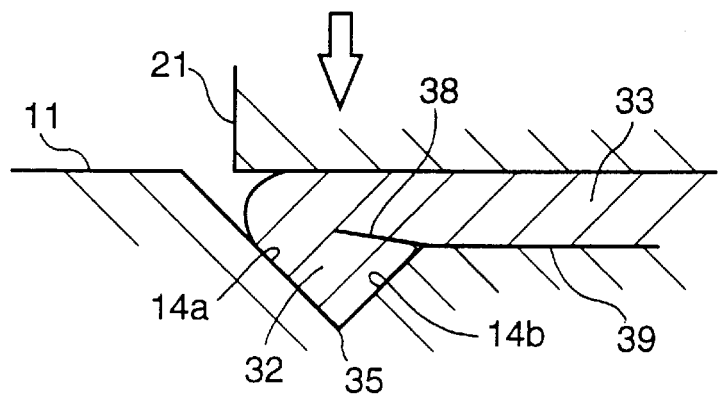

The workpiece 30 is then formed at the third step shown in FIGS. 1C and 1D. In this step, the workpiece 30 is positioned between the die 11 and the punch 21 of the press machine. The first portion 32 and the second portion 33 of the workpiece 30 are pressed between the V-shaped groove portion 12 of the die 11 and the punch 21 so that the first portion 32 is further bent in a direction toward the second portion 33. Due to this pressing action, the inboard surface 38 of the first portion 32 is brought into contact with the lower surface 39 of the second portion 33 that opposes the inboard surface 38 of the first portion 32 during the bending operation. In addition, during the bending operation, the outboard surface 37 of the first portion 32 is brought into contact with the first surface 14a of the V-shaped groove portion 12, and the free end surface 34 of the first portion 32 is brought into contact with the second surface 14b of the V-shaped groove portion 12. During further pressing, the thicknesses of the first portion 32 and the second portion 33 plastically change.

During the third step, the first surface 14a of the V-shaped groove portion 12 operates to guide the movement of the corner 35 of the first portion 32 between the outboard surface 37 and the free end surface 34 of the first portion 32.

Further, during the third step shown in FIGS. 1C and 1D, the time when the corner 35 between the outboard surface 37 and the free end surface 34 of the first portion 32 begins to contact the first surface 14a of the V-shaped groove portion 12 is set to be simultaneous with or earlier than the time when a second corner 36 between the inboard surface 38 and the end surface 34 of the first portion 32 begins to contact the second surface 14b of the V-shaped groove portion 12.

Figure 4:
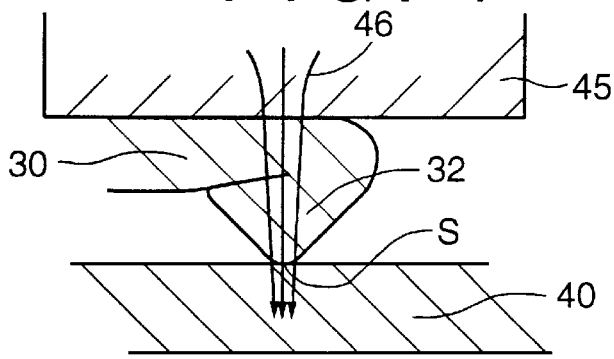
FIG. 4 is a cross-sectional view of one workpiece having the projection formed by the method of the present invention and another workpiece which are being projection-welded.

After the projection or corner 35 has been formed by the second and third steps shown in FIGS. 1B–1D, the projection 35 is pressed against another work 40 as illustrated in FIG. 4 and an electrical current 46 is conducted so that the two workpieces 30, 40 are projection-welded. During the projection-welding, the pressing force of the electrode 45 acts on the welding portion. During the welding, the first portion 32 may be welded to the second portion 33 at a portion of the contact portion of the surface 38 and the surface 39.

Figure 12:
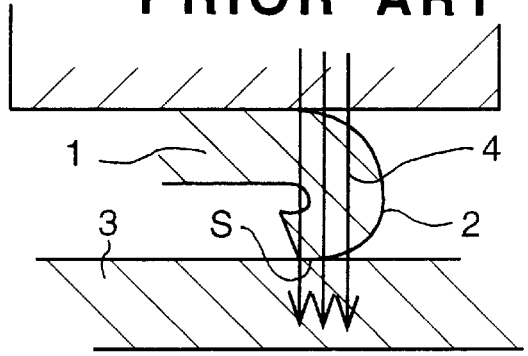
FIG. 12 is a cross-sectional view of a workpiece having the conventional projection and another workpiece which are being projection-welded.

In accordance with the present invention, since the corner of the stamped plate is formed to the corner of the projection utilizing the sharp shape of the lowermost point 15 of the V-shaped groove portion 12, a sharp tip of the projection can be easily formed. Further, since the first portion 32 contacts the second portion 33 by pressing and there is no gap between the first portion 32 and the second portion 33 after the pressing operation, the projection is unlikely to be deformed when the pressing force from the electrode acts on the projection. As a result, as illustrated in FIG. 4, a small contact area S between the projection and the other workpiece 40 can be maintained and the electrical current density 46 of the welding current at the contact area S is large compared with conventional arrangements such as discussed above and illustrated in FIG. 12.

Figure 9:
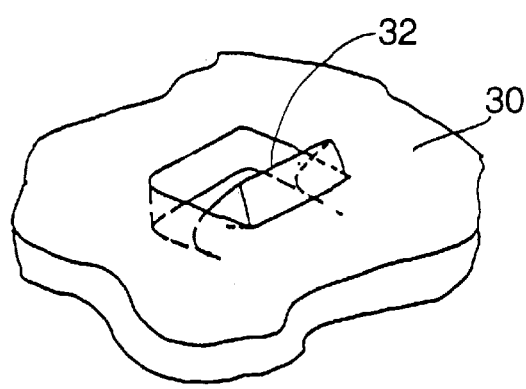
FIG. 9 is a perspective view of a projection formed by the method according to the present invention.
Figure 10:
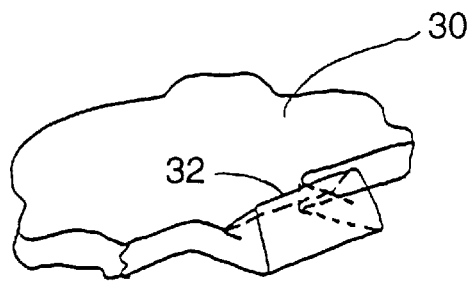
FIG. 10 is a perspective view of another projection formed by the method according to the present invention.
Figure 11:
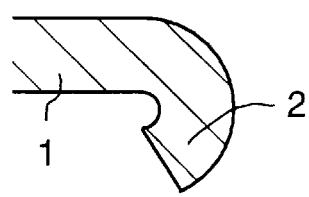
FIG. 11 is a cross-sectional view of a projection formed by the conventional method.

It is to be noted that the first portion 32 may be formed at the central portion of the workpiece 30 as illustrated in FIG. 9 or may be formed at the peripheral portion of the workpiece 30 as illustrated in FIG. 10.

Figure 5:
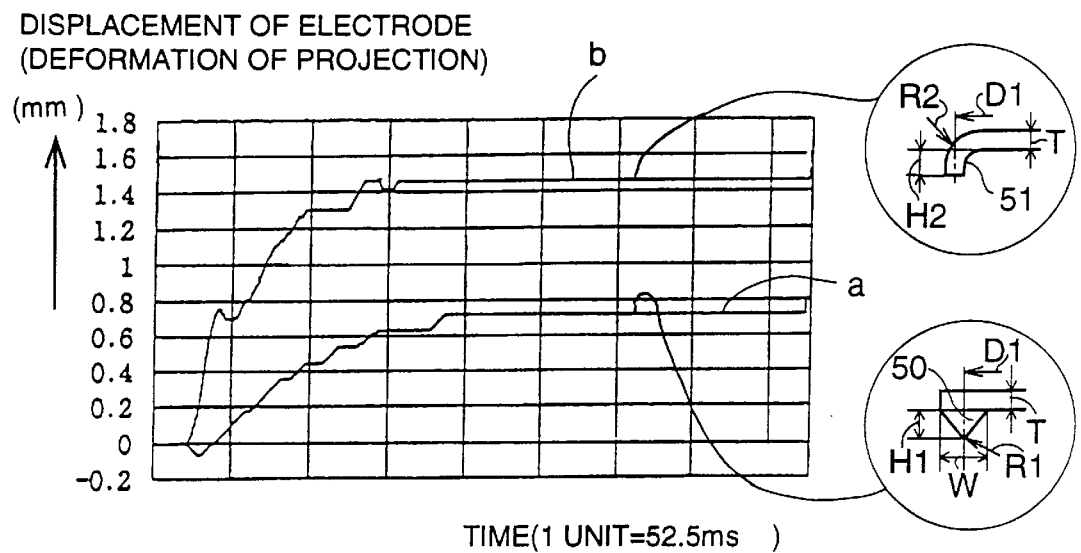
FIG. 5 is a graph illustrating the amount of deformation of the projection formed according to the method of the present invention and a projection formed according to the conventional method.

A test was conducted for investigating the amount of deformation of the projection 50 made using the method according to the present invention and the projection 51 made using the conventional method. Each of the projections 50, 51 had a thickness of 1 mm and a ring shape having a diameter of 50 mm. The projection 50 had a height H1 of 1 mm, a width W of 2.0 mm, and a radius R1 of R of the tip of 0.4 mm (substantially sharp). The projection 51 was made by bending the end portion in an L-shaped and had a height H2 of 1.6 mm and a radius R2 of the outboard surface of 1.4 mm. During the test, the pressing force during welding was 2.0 tons and the welding electrical current was 90 kA. The results of the tests are graphically shown in FIG. 5. With reference to FIG. 5, the curve a depicts the test results associated with formation of the projection 50 in accordance with the present invention and the curve b depicts the results associated with the formation of the projection 51 in accordance with the conventional method.

As seen from FIG. 5, the amount of deformation of the projection 50 is much smaller than that of the projection 51. As a result, the electrical current density at the projection 50 is high and the amount of heat generated at the projection 50 is large.

Figure 6:
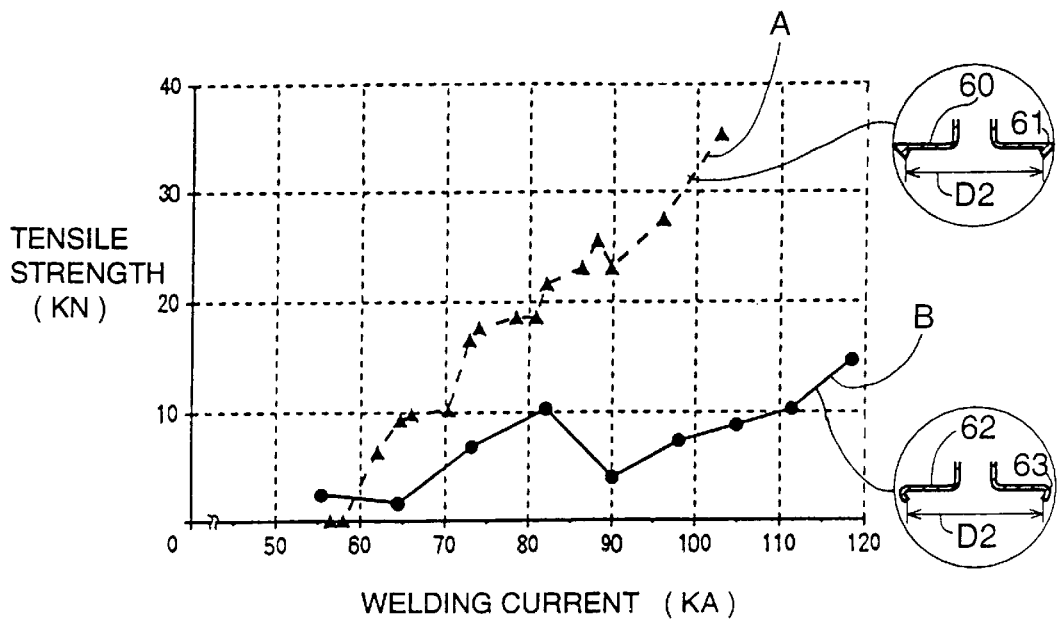
FIG. 6 is a graph illustrating strength versus electrical current features of the projection formed according to the present invention and the projection formed according to the conventional method.
Figure 7:
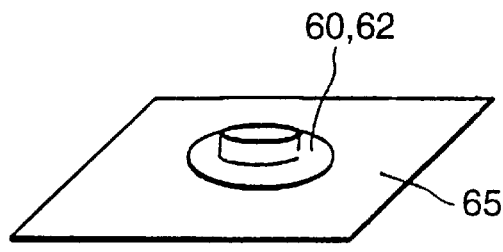
FIG. 7 is a perspective view of a welded test piece used in tests conducted to obtain the features exhibited in the graph of FIG. 6.
Figure 8:
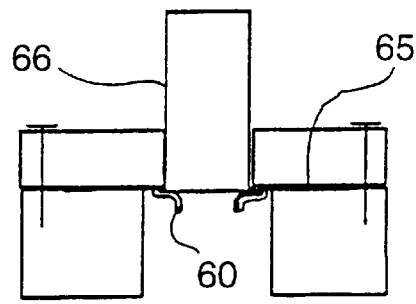
FIG. 8 is a cross-sectional view of a test rig used in the tests.

With reference to FIGS. 6–8, another test was conducted for investigating the welding strength of the ring projection 61 formed in the workpiece 60 using the method according to the present invention and projection-welded to the workpiece 65, and the welding strength of the ring projection 63 formed in the workpiece 62 using the conventional method and projection-welded to the workpiece 65. Each of the projections 61, 63 had a thickness of 0.8 mm and a ring shape having a diameter of 50 mm. During welding, the pressing force was 19.8 KN, and the welding time period was 0.4 seconds. In the strength test, the workpiece was fixed using the jig 66 shown in FIG. 8 and a load was imposed on the workpiece in the direction of the arrow. The welding strength was measured as the strength when the workpiece was broken. The results of the tests are shown in FIG. 6. With reference to FIG. 6, the curve A depicts the test results associates with the projection 61 while the curve B illustrates the test results associated with the projection 63.

As can be seen from FIG. 6, the welding strength of the projection 61 is much greater than that of the projection 63, and the welding strength of the projection 61 increases when the welding electrical current increases. With respect to the workpiece 60, when the welding electrical current was greater than 85 KA, the workpiece 60 was broken at a portion other than the projection 61. In contrast, with the workpiece 62, the welding strength did not increase even if the welding current was increased, and the workpiece 62 was broken at the projection 63 at every welding current.

Variations with respect to the general method described above will now be described. Because the first and second steps shown in FIGS. 1A and 1B for each embodiment of the present invention are substantially the same, a discussion of such steps will not be repeated in connection with the description of various embodiments of the present invention. The various embodiments of the present invention differ with respect to details associated with the third step shown in FIGS. 1C and 1D.

According to one embodiment of the present invention illustrated in FIGS. 1C and 1D, the time when the first corner 35 between the outboard surface 37 and the end surface 34 of the first portion 32 begins to contact the first surface 14a of the V-shaped groove portion 12 during the bending operation is designed to be simultaneous with the time when the second corner 36 between the inboard surface 38 and the end surface 34 of the first portion 18 begins to contact the second surface 14b of the V-shaped groove portion 12. More particularly, during the third step, the workpiece 30 is set so that a center line e between the outboard surface 37 and the inboard surface 38 of the first portion 32 passes through the lowermost point 15 of the V-shaped groove portion 12. When the punch 21 moves downward, the corner 35 of the first portion 23 moves along the first surface 14a to the lowermost point 15, and the workpiece 30 is pressed and plastically deformed.

Figure 2A:
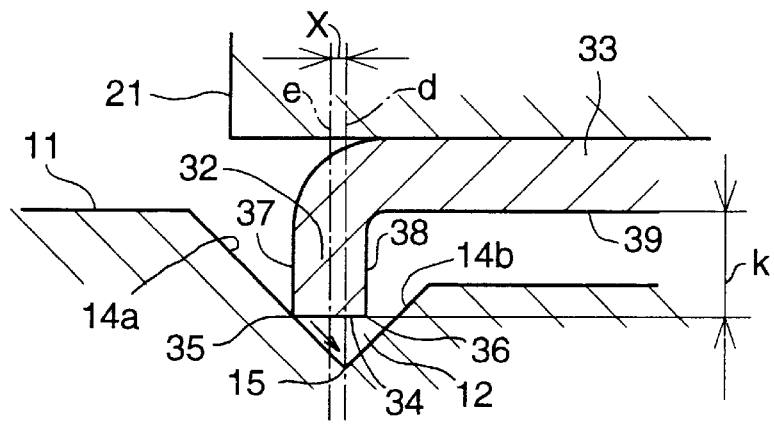
FIGS. 2A–2B are cross-sectional views of a workpiece illustrating how a projection is formed in a method according to a second embodiment of the present invention.
Figure 2B:
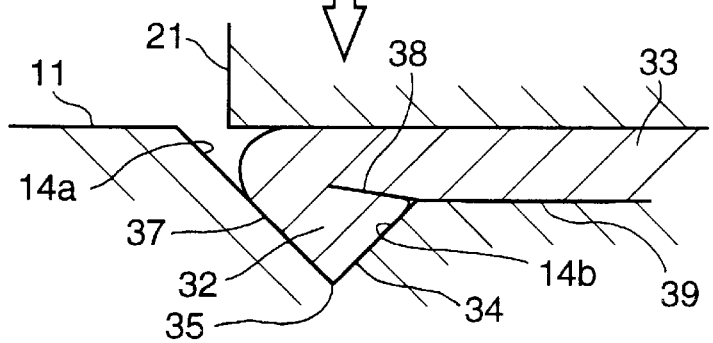

According to a second embodiment of the present invention which is illustrated in FIGS. 2A and 2B, the time when the first corner 35 between the outboard surface 37 and the free end surface 34 of the first portion 32 begins to contact the first surface 14a of the V-shaped groove portion 12 is designed to be earlier than the time when the second corner 36 between the inboard surface 38 and the free end surface 34 of the first portion 32 begins to contact the second surface 14b of the V-shaped groove portion 12. More particularly, during the third step, the workpiece 30 is set so that a center line e between the outboard surface 37 and the inboard surface 38 of the first portion 32 is located on the first surface side (i.e., the left side as seen in FIG. 2A) of the lowermost point 15 of the V-shaped groove portion 12. A vertical line d parallel to the center line e and passing through the lowermost point 15 of the V-shaped groove portion 12 is shown in FIG. 2A. The vertical line d and the center line e are illustrated as being separated by a distance X. When the punch 21 moves downward during the bending operation, the first portion 32 and the second portion 33 are pressed and the corner 35 of the first portion 32 moves along the first surface 14a to the lowermost point 15. Then, the workpiece 30 is further pressed and plastically deformed.

According to this second embodiment of the present invention, because the corner 35 contacts the first surface 14a of the V-shaped groove before the corner 36 contacts the second surface 14b of the V-shaped groove, the corner 35 is guided by the first surface 14a and the bending of the first portion 32 is reliably directed toward the second portion 33.

Figure 3:
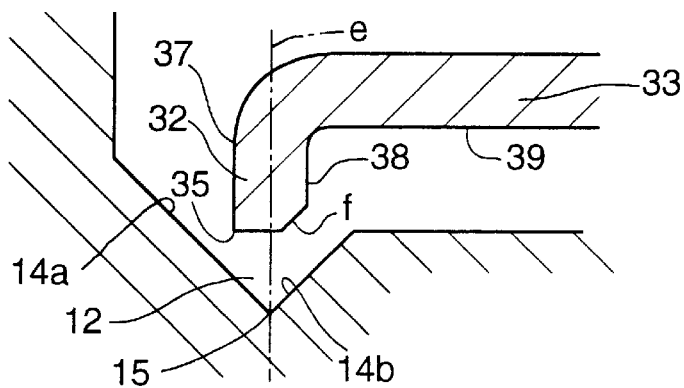
FIG. 3 is a cross-sectional view of a workpiece illustrating how a projection is formed in a method according to a third embodiment of the present invention.

In a third embodiment of the present invention illustrated in FIG. 3, the time when the first corner 35 between the outboard surface 37 and the end surface 34 of the first portion 32 begins to contact the first surface 14a of the V-shaped groove portion 12 is designed to be earlier than the time when the second corner 36 between the inboard surface 38 and the end surface 34 of the first portion 32 begins to contact the second surface 14b of the V-shaped groove portion 12. More particularly, during the second step, the corner between the inboard surface 38 and the end surface 34 of the first portion 32 is removed by machining or forming as indicated at f in FIG. 3. During the third step, the workpiece 30 is set so that a center line e between the outboard surface 37 and the inboard surface 38 of the first portion 32 passes through the lowermost point 15 of the V-shaped groove portion 12. When the punch 21 moves downward, the first portion 32 and the second portion 33 are pressed and the corner 35 of the first portion 32 moves along the first surface 14a to the lowermost point 15. Then, the workpiece 30 is further pressed and plastically deformed.

In this third embodiment, because the corner 35 contacts the first surface 14a of the V-shaped groove before the corner 36 contacts the second surface 14b of the V-shaped groove, the corner 35 is guided by the first surface 14a of the V-shaped groove and the bending of the first portion 32 is reliably directed toward the second portion 33.

By virtue of the present invention, a variety of advantages can be realized. For example, in the method according to the second embodiment, because the center line e is offset by the amount X toward the first surface 14a of the V-shaped groove from the line d, the cross-sectional area of the projection increases as compared with the projection of the first embodiment of the present invention. When it is necessary to maintain the cross-sectional area constant, the length of the first portion 32 should be shortened in the second embodiment of the present invention. However, since the length k of the first portion 32 is substantially equal to the thickness of the workpiece, shortening the length k will make the bending and press forming of the first portion difficult. However, in the third embodiment of the present invention, because the corner 36 is removed, shortening the first portion 32 is not necessary, and bending and deformation is relatively easy.

Since the end corner of the workpiece and the V-shaped groove portion are utilized for formation of the projection, the projection has a sharp tip. As a result, the welding electrical current density is maintained at a high level. Further, since the inboard surface of the first portion 32 contacts the second portion 33, the projection is unlikely to be largely deformed while it is pressed by the electrode during welding. As a result, the pressing force during welding can be large without having a detrimental impact. Thus, by virtue of the present invention, the welding strength is advantageously high.

In the situation where, during the bending step, the outboard surface of the first portion 32 corresponds to the surface of the plate which is first contacted by the stamping die, it is advantageously possible to easily obtain a projection having a tip angle equal to or greater than 90 degrees during the pressing step.

When the projection is formed by pressing, the formation is easy compared with a formation by forging.

When the time at which the first corner between the outboard surface and the end surface of the first portion 32 begins to contact the first surface 14a of the V-shaped groove portion is simultaneous with or earlier than the time when the second corner between the inboard surface and the end surface of the first portion 32 begins to contact the second surface 14b of the V-shaped groove portion, the first portion 32 can be reliably bent in the direction toward the second portion.

In the situation where the second corner of the first portion is removed, the first portion can be reliably bent in the direction toward the second portion without needing to shorten the first portion.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A method for forming a projection comprising the steps of:
    bending a workpiece at a bending portion such that a first portion of said workpiece located on one side of said bending portion that is closer to an end of said workpiece is substantially perpendicular to a second portion of said workpiece located on another side of said bending portion that is further away from said end of said workpiece; and
    pressing said first portion and said second portion of said workpiece between a punch and a V-shaped groove portion of a die so that said first portion of the workpiece is further bent in a direction toward said second portion while an outboard surface of said first portion is brought into contact with a first surface of said V-shaped groove portion and while an end surface of said first portion is brought into contact with a second surface of said V-shaped groove portion, said pressing being performed until an inboard surface of said first portion is brought into contact with a surface of said second portion that opposes said inboard surface of said first portion with thicknesses of said first portion and said second portion being plastically changed.

2. A method according to claim 1, wherein said workpiece that is bent is a workpiece that has been stamped with a stamping die, and during said step of bending said workpiece, said workpiece is disposed so that said outboard surface of said first portion is a surface of said plate which first contacted the stamping die.

3. A method according to claim 1, wherein the first portion possesses a corner that is located between said outboard surface and said end surface of said first portion, and during the step of pressing said first portion and said second portion the first surface of said V-shaped groove portion guides movement of the corner.

4. A method according to claim 1, wherein said step of bending said workpiece includes bending said workpiece such that a length of said first portion is substantially equal to a thickness of said first portion.

5. A method according to claim 1, wherein said step of pressing said first portion and said second portion involves pressing by a press machine.

6. A method according to claim 1, wherein said first portion includes a corner located between said outboard surface and said end surface of said first portion, and including the step of projection-welding said workpiece with another workpiece such that a projection formed by said corner is pressed against said another workpiece and a welding electrical current is conducted.

7. A method according to claim 1, wherein a first time when a first corner between said outboard surface and said end surface of said first portion begins to contact said first surface of said V-shaped groove portion is simultaneous with or earlier than a second time when a second corner between said inboard surface and said end surface of said first portion begins to contact said second surface of said V-shaped groove portion.

8. A method according to claim 7, wherein said first time is simultaneous with said second time.

9. A method according to claim 7, wherein said first time is earlier than said second time.

10. A method according to claim 9, wherein said V-shaped groove portion has a bottom corner formed by intersection of the first and second surfaces, and during said step of pressing said first portion and said second portion, said workpiece is positioned relative to the die such that a center line between said outboard surface and said inboard surface of said first portion is located on one side of the bottom corner of said V-shaped groove portion, and then said step of pressing said first portion and said second portion is performed.

11. A method according to claim 9, wherein said workpiece is designed so that a portion of the workpiece between said inboard surface and said end surface of said first portion is removed.

12. A method for forming a projection used in projection welding, comprising:
    providing a workpiece having a bent portion such that a first portion of said workpiece located on one side of said bent portion is substantially perpendicular to a second portion of said workpiece located on an opposite side of said bent portion; and
    pressing said first portion and said second portion of said workpiece between a punch and a die which is provided with a groove to further bend said first portion of the workpiece towards said second portion, the groove in the die having first and second surfaces that are angularly oriented relative to one another, said pressing being performed while an outboard surface of said first portion is in contact with the first portion of said groove, said pressing being performed until an inboard surface of said first portion is brought into contact with a surface of said second portion that opposes said inboard surface of said first portion.

13. A method according to claim 12, wherein the first portion of the workpiece possesses a corner that is located between said outboard surface and said end surface of said first portion, and during the step of pressing said first portion and said second portion the first surface of said groove guides movement of the corner.

14. A method according to claim 12, wherein said step of bending said workpiece includes bending said workpiece such that a length of said first portion is substantially equal to a thickness of said first portion.

15. A method according to claim 12, wherein said first portion includes a corner located between said outboard surface and said end surface of said first portion, and including the step of projection-welding said workpiece with another workpiece such that said corner pressed against said another workpiece.

16. A method according to claim 12, wherein said workpiece includes a first corner located between said outboard surface and said end surface of said first portion and a second corner located between said inboard surface and said end surface of said first portion, and wherein the first corner is brought into contact with said first surface of said groove simultaneous with when the second corner is brought into contact with said second surface of said groove.

17. A method according to claim 12, wherein said workpiece includes a first corner located between said outboard surface and said end surface of said first portion and a second corner located between said inboard surface and said end surface of said first portion, and wherein the first corner is brought into contact with said first surface of said groove earlier than when the second corner is brought into contact with said second surface of said groove.

18. A method according to claim 12, wherein said groove has a bottom corner formed by an intersection of the first and second surfaces, and during said step of pressing said first portion and said second portion, said workpiece is positioned relative to the die such that a center line between said outboard surface and said inboard surface of said first portion is located on one side of the bottom corner of said groove.

19. A method according to claim 12, wherein said step of providing a workpiece includes providing a workpiece in which a portion of the workpiece between said inboard surface and said end surface of said first portion is removed.

* * * * *